(12) United States Patent
Heidemann et al.

(10) Patent No.: US 9,110,290 B2
(45) Date of Patent: Aug. 18, 2015

(54) LOW OUTGASSING RESONATOR

(71) Applicants: Rainer Heidemann, München (DE);
Matthias Scholz, München (DE)

(72) Inventors: Rainer Heidemann, München (DE);
Matthias Scholz, München (DE)

(73) Assignee: Toptica Photonics AG, Grafelling (DE)

(*) Notice: Subject to any disclaimer, the term of this patent is extended or adjusted under 35 U.S.C. 154(b) by 321 days.

(21) Appl. No.: 13/804,108

(22) Filed: Mar. 14, 2013

(65) Prior Publication Data

US 2013/0242366 A1 Sep. 19, 2013

(30) Foreign Application Priority Data

Mar. 16, 2012 (DE) .................. 10 2012 005 154

(51) Int. Cl.
*G02B 26/08* (2006.01)
*G02F 1/35* (2006.01)

(52) U.S. Cl.
CPC ............ *G02B 26/0833* (2013.01); *G02F 1/353* (2013.01); *G02F 2001/3505* (2013.01)

(58) Field of Classification Search
CPC ... G02F 2001/3505; G02F 1/353; G02F 1/00; G02F 1/3551; G02B 26/0833; H01S 3/109; G03B 21/14; G03B 21/20; G03B 21/28; G03B 27/522; G03B 33/12
See application file for complete search history.

(56) References Cited

U.S. PATENT DOCUMENTS

2012/0287418 A1* 11/2012 Scherer et al. .................. 356/51

FOREIGN PATENT DOCUMENTS

DE 102006044591 A1 4/2008
DE 102007027680 B3 2/2009

* cited by examiner

*Primary Examiner* — James Phan
(74) *Attorney, Agent, or Firm* — Berliner & Associates (57) ABSTRACT

The invention relates to an optical resonator made of low-outgassing materials, comprised of at least one chamber, a non-linear crystal arranged in the chamber, and an array of mirrors arranged in the chamber and comprised of a plurality of mirrors for deflecting a light beam. To specify such a resonator which is low-outgassing and which ensures fine adjustment of the optical elements at the same time, the present invention proposes that the non-linear crystal and at least one mirror of the array of mirrors is arranged on one movable carrier each, wherein the said carrier is fabricated from a low-outgassing material and seals the chamber.

12 Claims, 7 Drawing Sheets

LOW OUTGASSING RESONATOR

The invention relates to an optical resonator made of low-outgassing materials, comprised of at least one chamber, a non-linear crystal arranged in the chamber, and an array of mirrors arranged in the chamber and comprised of a plurality of mirrors for deflecting a light beam.

Optical resonators of this type, for example, are utilized for frequency conversion of a light beam, more particularly a laser beam. Requirements exacted from the setup of an optical resonator are high. In case of generating ultraviolet laser radiation, in particular, high purity in the surrounding of the non-linear crystal is required. What is striven for is an environment composed of low-outgassing materials, whereby the choice of materials eligible for the setup of a resonator is noticeably confined.

The term "outgassing" defines a process in which materials dissipate impurities even down to extremely low partial pressures ($<10^{-10}$ Torr). This liberation of gases (outgassing) is problematic for an optical resonator, because impurities settle down on optical elements—e.g. on mirrors and on the non-linear crystal—and thus may adversely affect the functional mode, more particularly the quality of the optical resonator. Eligible as low-outgassing materials, for example, are metals and glasses, but even PTFE and piezoelectric ceramics and crystals.

To date, excimer and solid state laser systems are applied in the ultraviolet radiation range. In operation, they usually emit at a fixed wavelength. In this case, the resonators can be adjusted ex works, thus not calling for any (post) adjustment of the optical elements if wavelength varies.

The situation is different with diode lasers, whose wavelength can be varied over a greater spectral range. In this case, the optical elements and the non-linear crystal must be movable in order to be able to consider a shift in wavelength. The non-linear crystal, in particular, must be rotatable about the correct phase alignment angle in case of a wavelength shift and be adjustable, unless other phase alignment mechanisms as for example via temperature are insufficient.

On account of the limited choice of low-outgassing materials on the one hand and on the other hand because of the requirement demanding configuring the resonator in such a manner that a fine adjustment of the optical elements with regard to wavelength alignment is feasible, in particular when using light within the ultraviolet range, those optical resonators currently available do not fulfill all requirements exacted and hence they should be regarded as a compromise solution in which either the selected materials are low-outgassing materials or in which a fine adjustment of the optical elements is feasible.

Against this background, it is the object of the present invention to provide an optical resonator of the afore-mentioned type which on the one hand is a low-outgassing material and which at the same time allows for a fine adjustment of the optical elements without entailing any disproportionate increase in manufacturing expenditure and cost of material.

This task is solved by arranging the non-linear crystal and at least one mirror of the mirror array each on a movable carrier which is fabricated from low-outgassing material and which seals the chamber so as to prevent ingress of any impurities into the resonator chamber.

This enables a fine adjustment of the optical elements of the resonator, whilst the chamber sealing is ensured at the same time. Moreover, the choice of the carrier material takes the effect of protecting the chamber and the components accommodated therein from contamination due to carrier material outgassing.

Eligible as nonlinear crystals are anti-reflex coated crystals which are cut for normal incidence of a light beam and which are particularly suitable for generating light below a wavelength of 400 nm.

To counteract initial damage at the surface of the non-linear crystal which is evoked by the absorbing boundary layers between the non-linear crystal and the coating or by the coating itself, it may preferably be cut near the Brewster angle and in that case it will not need any anti-reflect coating.

In a preferred embodiment of the optical resonator, it is provided for that the carriers are movable from the outside, with the resonator being closed. With this preferred embodiment, an adjustment of the mirrors and of the non-linear crystal is feasible, for example, during the operation of the optical resonator. This reduces the risk of contaminating or damaging the mirrors and non-linear crystal or prevents contamination in general from penetrating into the interior when opening the optical resonator for the purpose of adjusting the mirrors and the non-linear crystal. Moreover, the possibility of being able to make an adjustment to the mirrors and to the non-linear crystal from the outside simplifies operability of the inventive optical resonator because one cannot intervene into the itinerary of light.

Furthermore, it is preferable to have carriers that are movable by means of at least one fine-thread screw. In this manner, the carriers are easy and precise to adjust with the optical elements connected therewith.

In another preferred embodiment, the fine-thread screw is spring-preloaded, wherein the spring load is preferably directed opposite to the screw-in direction of the fine-thread screw, thus counteracting a fabrication-prompted play between the fine-thread screw and the threaded bore.

It is moreover preferable that at least one of the carriers seals the chamber via a hermetically air-tight sealed solid state hinge. This setup represents a cost-efficient possibility which on the one hand ensures excellent sealing of the chamber of the optical resonator and on the other hand it ensures very good movability in combination with high stability.

It is especially advantageous for the carriers to be fabricated from metal. It has become evident that carriers made from nickel silver or aluminum feature very good mechanical properties and are suitable for the setup of movable carriers. Moreover, nickel silver and aluminum are low-outgassing materials.

The carriers are preferably fabricated by means of wire erosion. Thereby it is ensured that the carrier material properties are not adversely affected during the fabrication process and in particular that impurities which might outgas later-on are prevented from penetrating into the carrier material during the fabrication process. Moreover, wire erosion allows for fabricating carriers with very little fabrication tolerances. Openings in the carriers developing during wire erosion are subsequently closed by soldering or welding in order to hermetically seal the carrier.

Furthermore, an indium wire is preferably arranged between the carrier and the casing as well as between the carrier and the mirror in order to seal the chamber. Indium wires are distinguished by their good flow properties and thus they are best suitable to serve as sealing material, in particular because pure indium wires are low-outgassing materials and thus they can unobjectionably be utilized in the inventive optical resonator.

Another preferred embodiment of the present invention provides for that the non-linear crystal is rotatable in the phase alignment plane. This is furthermore realized in that the non-linear crystal is mounted on an axis which allows for a rotation in the phase alignment plane—stretched-on by the beam propagation direction of the circulating fundamental wave and the optical axis of the non-linear crystal.

The non-linear crystal is furthermore preferably coupled thermally with the pertaining carrier. A thermic coupling of the non-linear crystal to the carrier takes the effect that the non-linear crystal can be held at the temperature necessary for the phase alignment. The carrier is furthermore preferably coupled thermally with a Peltier element, a heat exchanger and/or a temperature sensor (e.g. a thermistor). Owing to thermic coupling, these elements, however, can be located outside the optical resonator and thus they themselves need not be low-outgassing. With the preferred embodiment of the present invention, in which the non-linear crystal is mounted on a rotatable axle, the axle of the carrier is also thermally coupled with a Peltier element, a heat exchanger and/or a temperature sensor (e.g. a thermistor), though thermally uncoupled from the carrier itself.

In case of damage to the non-linear crystal caused by ultraviolet light, the crystal should be able to be shifted vertically to the beam propagation direction. To this effect, the fine-thread screws of the crystal carrier are mounted on a rack that generates a mere translation of the crystal carrier vertically to the beam direction through the non-linear crystal.

In order to permanently ensure purity in the surrounding of the non-linear crystal, the present invention furthermore provides for that a getter material is arranged in the chamber. Getter materials take the effect that possibly existing impurities and moisture can be captured and intercepted and do not settle down on the surfaces of the mirrors and of the non-linear crystal.

The invention is elucidated in the following by way of a practical example, where.

Figure 1:
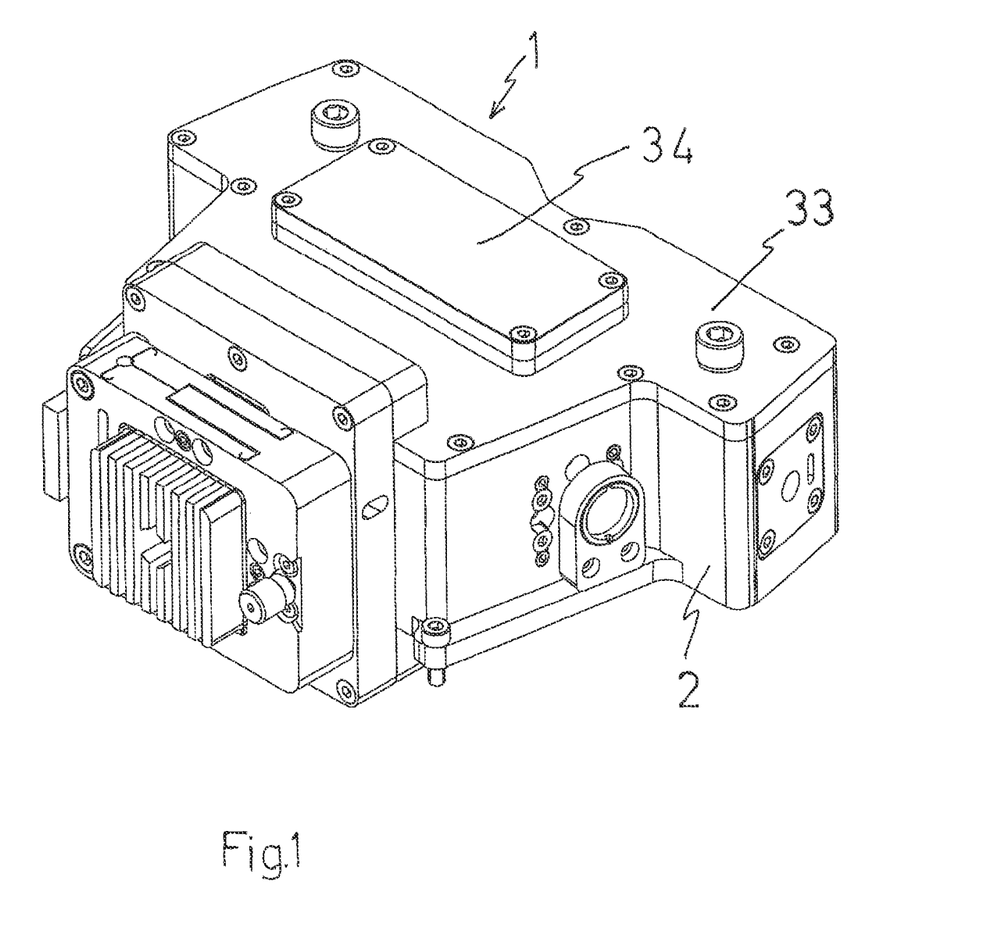
FIG. 1: is a perspective view of an inventive resonator.
Figure 2:
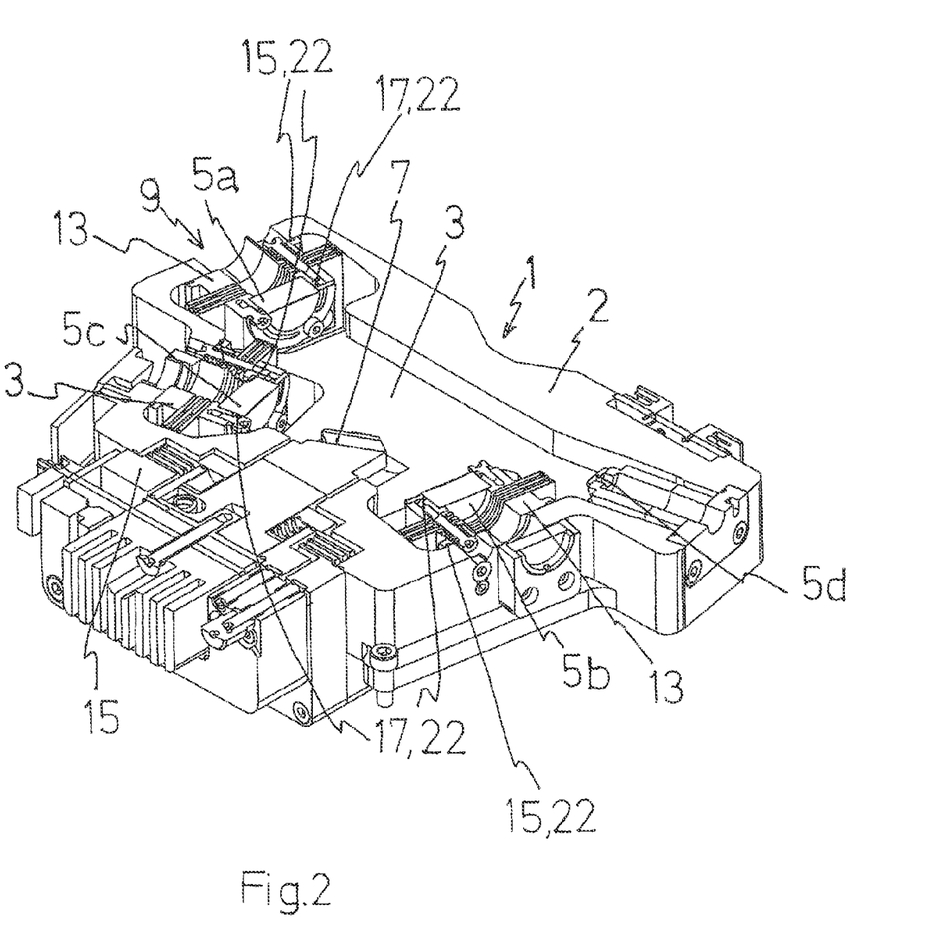
FIG. 2: is a perspective horizontal sectional view of the resonator of FIG. 1.
Figure 3:
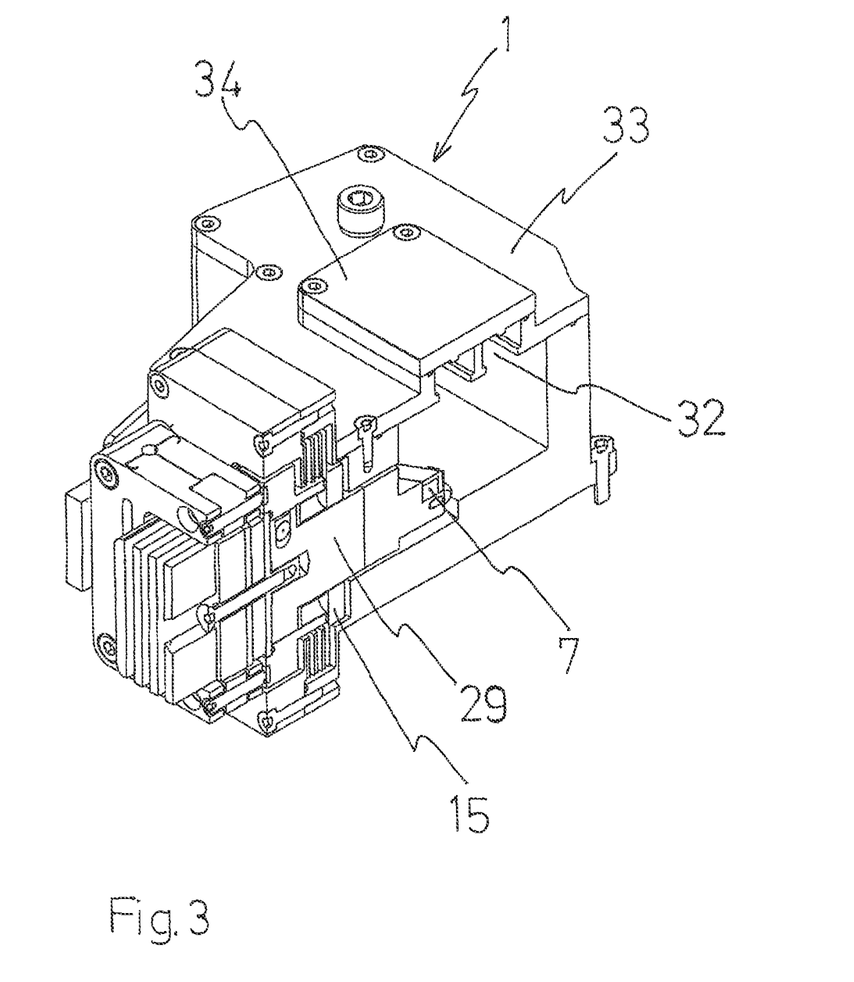
FIG. 3: is a perspective vertical sectional view of the resonator of FIG. 1.

FIGS. 1, 2, and 3 show various views of an inventive optical resonator in a bow-tie arrangement. The optical resonator 1 is comprised of a resonator base body 2, which defines a resonator chamber 3 in which mirrors 5a, 5b, 5c, and 5d are arranged. Located in between of mirrors 5b and 5c is a non-linear crystal 7. The mirrors 5b and 5c are usually configured in an optical resonator in a bow-tie arrangement as curved mirrors, whereas mirrors 5a and 5d are usually planar.

The optical resonator 1 moreover comprises a light entrance opening 9 which serves for coupling-in a laser beam into the resonator chamber 3. The light entrance opening 9 furthermore comprises a usually planar mirror 5a which is configured as coupling-in mirror.

The mirrors 5a, 5b, and 5c each are arranged on a carrier 13 configured as a metal bellows, said carrier being firmly and tightly connected with the casing of the optical resonator. The non-linear crystal 7 is also arranged on a carrier 15, which is configured as a metal bellows and which is connected with the casing of the optical resonator. The carrier 13 is shown separately in FIGS. 4 and 5, whereas the carrier 15 is shown separately in FIGS. 6 and 7.

Owing to the setup of the carriers 13 and 15 as hermetically sealed solid state hinges, a sealing of the resonator chamber 3 is thus brought about, whilst also ensuring movability of the optical elements connected therewith—in this case it is mirror 5a, 5b, and 5c as well as the non-linear crystal 7.

Figure 4:
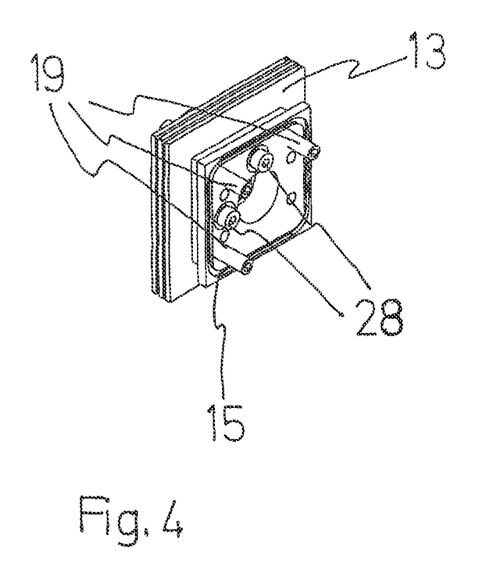
FIG. 4: is a perspective view of a mirror retainer.
Figure 5:
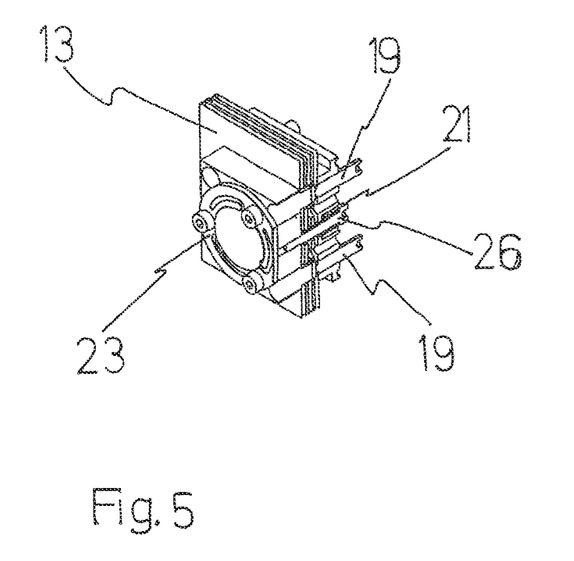
FIG. 5: is a perspective vertical sectional view of the mirror retainer of FIG. 4.

To seal the resonator chamber 3 between the carrier 13 and the resonator base body 2, grooves 15 are embedded onto the carrier 13, said grooves accommodating the sealing 22 made of indium wire. Furthermore, to provide for a sealing between mirrors 5a, 5b, and 5c as well as the carrier 13, a plate 23 each is pressed onto the indium wire 22 embedded in an annular groove 17. All screwed-on elements, e.g. lids and piezo carriers, are thus preferably sealed with a sealing made of indium.

To adjust the mirrors 5a, 5b, and 5c, three fine-thread screws 19 are provided for each carrier 13. The fine-thread screws 19 are so arranged that they form a three-point suspension which allows for shifting the mirror 5a, 5b, or 5c connected therewith along its optical axis as well as a rotation of the same about two axes being vertical towards the optical axis. For further adjustment, clamping screws 28 are provided for, there being springs 21 arranged within the carrier 13, the spring load of which works against the screw-in direction of the fine-thread screws 19.

Figure 6:
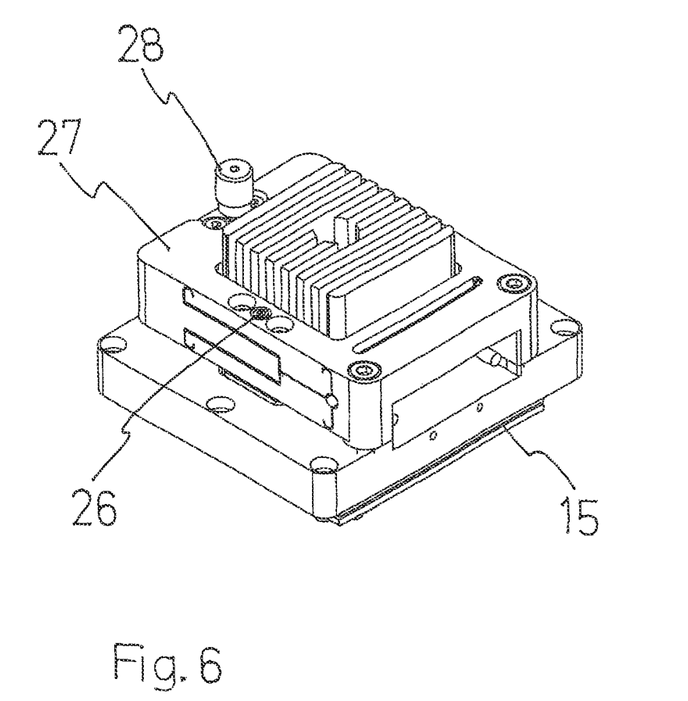
FIG. 6: is a perspective view of a crystal retainer.
Figure 7:
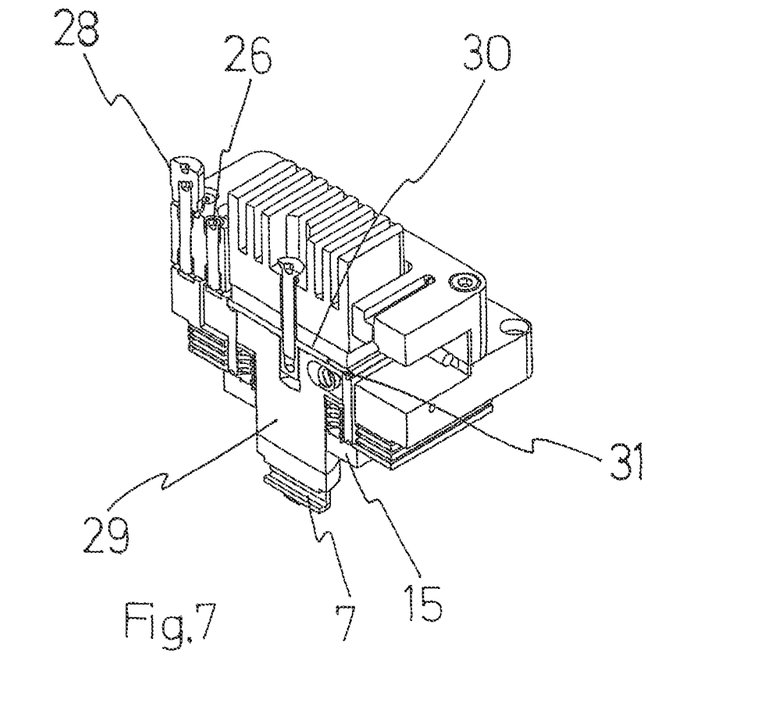
FIG. 7: is a perspective vertical sectional view of the crystal retainer of FIG. 6.

The functional mode of carrier 15 of the non-linear crystal 7 basically corresponds to that of carrier 13. Besides, the non-linear crystal 7 can be shifted vertically versus the beam propagation direction by the non-linear crystal 7 and rotated, if required. Fine-thread screws 26 of the carrier 15 are mounted on a rack 27 for adjusting the position of the non-linear crystal 7, said rack being equipped with guide levers configured as a parallelogram. This arrangement of the guide levers permits the carrier 15 to execute a mere translation without tilting by turning a translation screw 28. The non-linear crystal 7 is moreover mounted on a movable axle 29 enabling a rotation in the phase alignment plane.

Additionally, the axle 29 is thermally coupled with the non-linear crystal 7 proper so that for example the heat needed for operation can be supplied or a Peltier element 30 and/or thermistor 31 for temperature control can be arranged outside the resonator chamber 3. A getter chamber 32 for getter materials is provided for in a lid 33 of the chamber 3. This getter chamber is provided with a lid 34 of its own so as not to need opening the lid 33 of the resonator 1 when exchanging the getter material.

The functional mode of the practical example outlined hereinabove of the inventive optical resonator 1 is described in the following.

A light beam is coupled-in through the light entrance opening 9 into the chamber 3 of the optical resonator 1 and directed to the mirror 5d where it is reflected via mirror 5b to mirror 5c. The light beam is passed between mirrors 5b and 5c through the non-linear crystal 7, whereby its frequency is doubled. For uncoupling of the frequency-doubled light beam, one of the mirrors 5d, 5b or 5c, preferably 5b, is configured as an uncoupling mirror.

The mirrors 5a, 5b and 5c and possibly the mirror 5d as well as the non-linear crystal 7 can be variably positioned for the purpose of adjustment and adaptation to a certain light wave length. By turning the fine-thread screws 19 each arranged at carrier 13, the mirrors 5a, 5b, and 5c can be moved from the outside. Moreover, the orientation of the non-linear crystal can be modified by turning the axle 29 relative to the incident light beam in order to fulfill and meet the conditions and requirements for phase alignment.

By turning the translation screw 28, the non-linear crystal 7 can be shifted vertically versus the beam propagation direction in case of an optically induced damage so that the incident light beam can hit on a non-damaged spot of the non-linear crystal 7.

The invention claimed is:

1. Optical resonator made of a low-outgassing material, comprised of at least one chamber, a non-linear optical crystal arranged in the chamber, and an array of mirrors arranged in the chamber and comprised of a plurality of mirrors for deflecting a light beam characterized in that the non-linear optical crystal and at least one mirror of the mirror array are arranged on one movable carrier each which is fabricated from low-outgassing material and which seals the chamber.

2. Optical resonator as defined in claim 1, characterized in that the carriers are movable from the outside whilst the resonator is closed.

3. Optical resonator as defined in claim 1, characterized in that the carriers are movable by means of at least one fine thread screw.

4. Optical resonator as defined in claim 3, characterized in that the fine-thread screw is spring-preloaded.

5. Optical resonator as defined in claim 1, characterized in that at least one of the carriers seals the chamber via a hermetically enclosed solid-state hinge.

6. Optical resonator as defined in claim 1, characterized in that at least one of the carriers is fabricated from metal.

7. Optical resonator as defined in claim 1 characterized in that the carriers are fabricated by means of wire erosion, wherein the openings thus developing are closed by soldering or welding.

8. Optical resonator as defined in claim 1, characterized in that an indium wire for sealing the chamber is arranged between carrier and casing as well as between carrier and mirror.

9. Optical resonator as defined in claim 1, characterized in that the non-linear optical crystal is rotatable in the phase alignment plane.

10. Optical resonator as defined in claim 1, characterized in that the non-linear optical crystal can be shifted vertically versus the beam propagation direction.

11. Optical resonator as defined in claim 1, characterized in that non-linear optical crystal can be stabilized for temperature and is thermally uncoupled from a resonator base body.

12. Optical resonator as defined in claim 1, characterized in that a getter material is arranged in the chamber.

* * * * *